United States Patent
Rhoades

(10) Patent No.: US 11,754,213 B2
(45) Date of Patent: Sep. 12, 2023

(54) HOSE CLAMP

(71) Applicant: NIFCO AMERICA CORP., Canal Winchester, OH (US)

(72) Inventor: William Russell Rhoades, Columbus, OH (US)

(73) Assignee: NIFCO AMERICA CORP., Canal Winchester, OH (US)

(*) Notice: Subject to any disclaimer, the term of this patent is extended or adjusted under 35 U.S.C. 154(b) by 391 days.

(21) Appl. No.: 17/236,510

(22) Filed: Apr. 21, 2021

(65) Prior Publication Data
US 2022/0341524 A1 Oct. 27, 2022

(51) Int. Cl.
*F16L 33/12* (2006.01)
*F16L 23/06* (2006.01)

(52) U.S. Cl.
CPC .............. *F16L 33/12* (2013.01); *F16L 23/06* (2013.01)

(58) Field of Classification Search
CPC . F16L 33/12; F16L 23/10; F16L 23/06; Y10T 24/1418; Y10T 24/1422; Y10T 24/1424
See application file for complete search history.

(56) References Cited

U.S. PATENT DOCUMENTS

| | | | | |
|---|---|---|---|---|
| 629,315 | A * | 7/1899 | Dorticus | F16L 55/172 24/484 |
| 3,276,089 | A * | 10/1966 | Cheever | F16L 33/12 24/270 |
| 4,381,585 | A * | 5/1983 | Morel | F16B 2/185 24/270 |
| 5,366,263 | A * | 11/1994 | Hendrickson | F16L 17/04 285/364 |
| 5,380,052 | A * | 1/1995 | Hendrickson | F16L 23/06 285/364 |
| 9,334,991 | B2 * | 5/2016 | Weinhold | F16L 23/06 |

* cited by examiner

*Primary Examiner* — Robert Sandy
(74) *Attorney, Agent, or Firm* — Manabu Kanesaka

(57) ABSTRACT

A hose clamp includes an open ended ring body having a first engagement pin located at one end portion, a second engagement pin located at another end portion, and a retaining clip located adjacent the first engagement pin; and a connecting lever detachably attached to the ring body, and including a lever body having a first pivot notch located on one end, a second pivot notch spaced away from the first pivot notch, and a clipping slot located at another end. The first notch of the lever is connected to the first engagement pin of the ring, and the second notch is connected to the second engagement pin of the ring. When the lever is rotated relative to the ring body, the first notch pivots around the first engagement pin and the second notch of the lever pulls the second engagement pin around the first engagement pin.

6 Claims, 24 Drawing Sheets

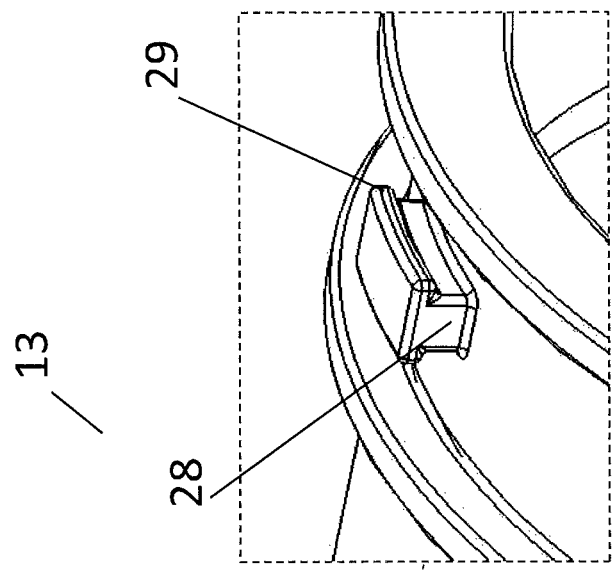
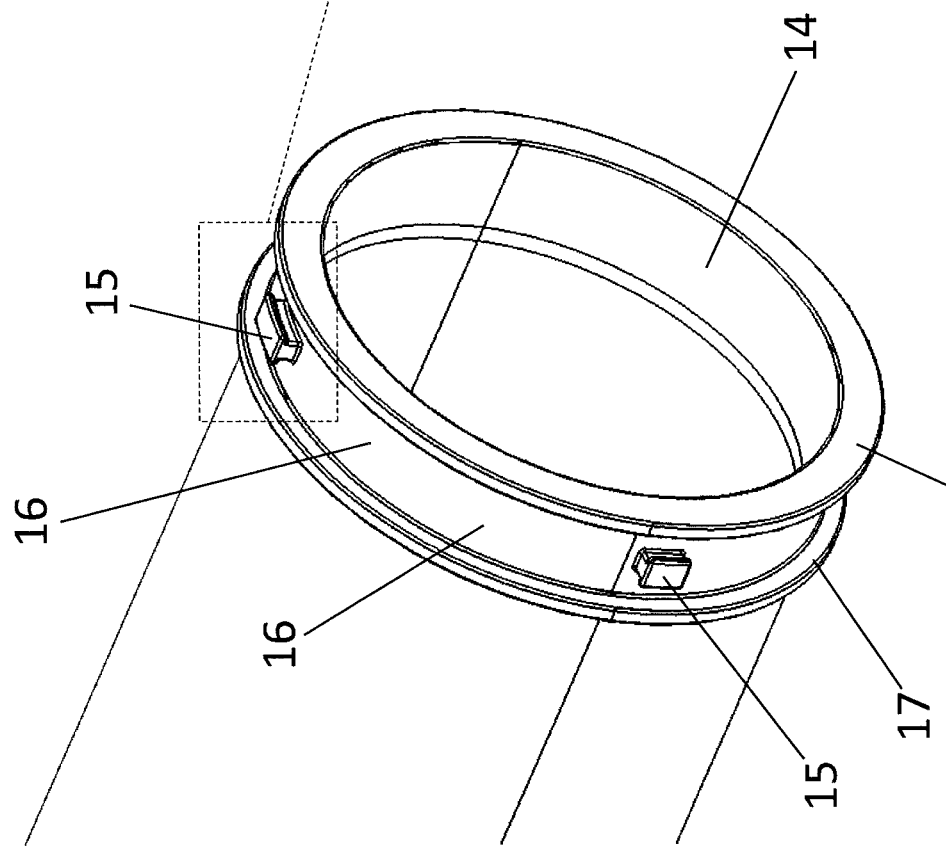
Fig. 14(a)
Fig. 14(b)

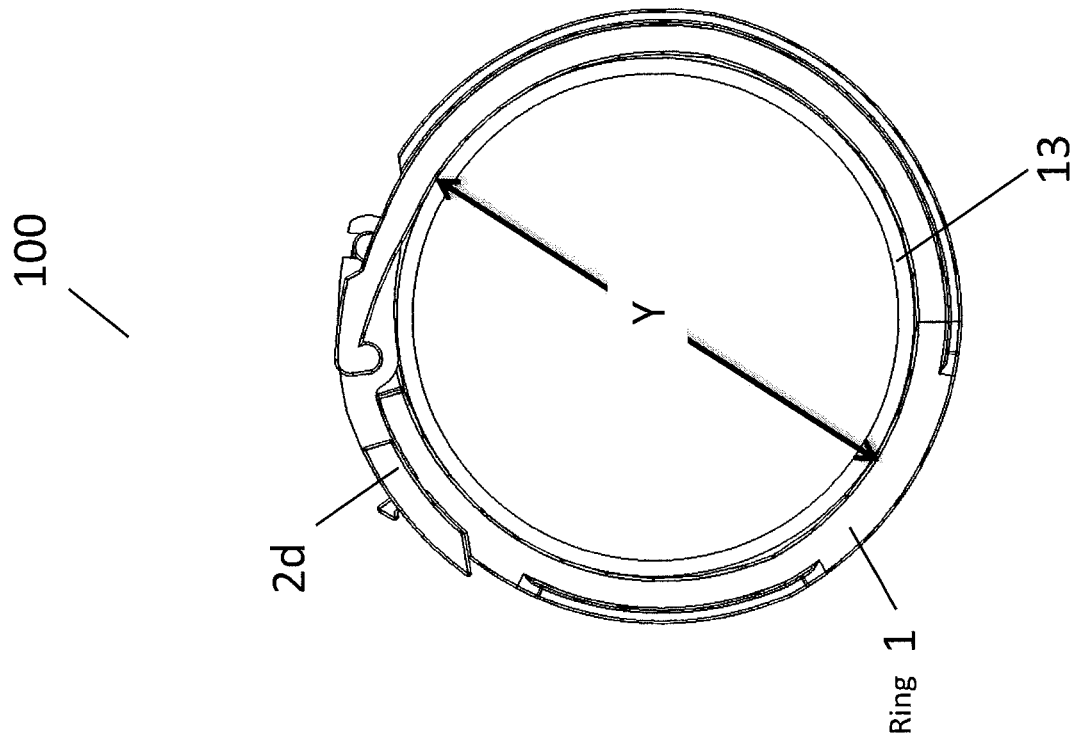
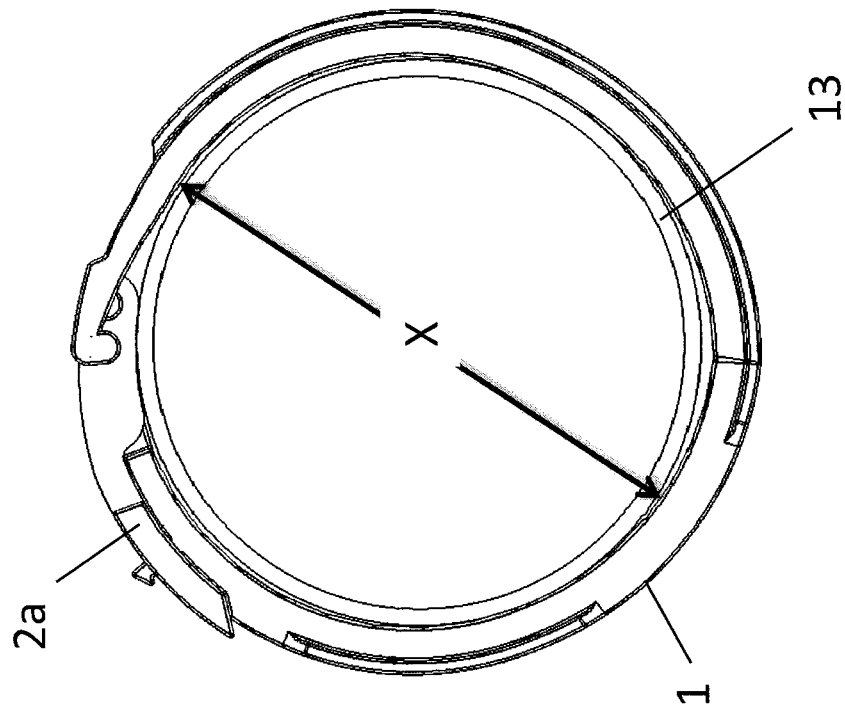

HOSE CLAMP

FIELD OF THE INVENTION

The present invention relates to a hose clamp which clamps a hose connection part from the outside. More specifically, the present invention relates to a hose clamp used to retain an air intake hose on a motor vehicle.

BACKGROUND OF THE INVENTION

Conventionally, there are known hose clamps for clamping air intake hose using a screw gear. These clamps are formed by overlapping two ends of an elongated thin steel sheet with slots that come together within a housing which contains a threaded screw. The screw threads engage in the slots causing the diameter of the hose clamp to increase or decrease by turning the head of the screw. These types of the hose clamps not only require a tool to install or remove the intake hose, but are also time consuming during the production process of a motor vehicle. The assembly line worker must install the air intake hose between the engine throttle body and the air cleaner enclosure, then acquire a tool, and then tighten the screw of the clamp on an end of the air intake hose. This process is then reversed to remove the air intake hose from the motor vehicle for repair or maintenance.

In order to reduce the assembly time during the assembly process, a hose clamp according to the present invention has been proposed.

It is an object of the invention is to provide a hose clamp which can be manufactured easily, and can be used easily to clamp a hose. Other objects and advantages of the invention will be apparent from the following description of the invention.

SUMMARY OF THE INVENTION

A hose clamp according to the invention comprises an open ended ring body including a first engagement pin located at one end portion of the ring body, a second engagement pin located at another end portion of the ring body, and a retaining clip located adjacent the first engagement pin; and a connecting lever detachably attached to the ring body, and including a lever body having a first pivot notch located on one end of the lever, a second pivot notch spaced away from the first pivot notch, and a clipping slot located at another end of the lever. The first notch of the lever is connected to the first engagement pin of the ring and the second notch is connected to the second engagement pin of the ring. When the lever is rotated relative to the ring body, the first notch of the lever pivots around the first engagement pin of the ring and the second notch of the lever pulls the second engagement pin on the ring over and around the first engagement pin of the ring body. Then, the retaining clip enters the clip slot.

In the invention, the cam mechanism created by the connecting lever reduces the internal diameter of the ring body securing the clamp to the hose. The leverage principle of the connecting lever allows the clamp to be installed and removed without the use of a tool.

In the invention, the ring body further includes a pivot arm at the one end portion, two first pivot pins, as the first engaging pin, provided on two sides of the pivot arm, two pivot arms at the another end portion with a space therebetween, and two second pivot pins, as the second engaging pin, provided inner surfaces of the two pivot arms.

In this connection, the lever body includes two lever pivot arms with a space therebetween, two open pivot notches, as the first pivot notch, to engage the first pivot pins, two closed pivot notches, as the second pivot notch, to engage the two second pivot pins, and a latch tab attached to the two lever pivot arms and having the clipping slot therein.

The lever body is connected to the ring body by the two first pivot pins, the second pivot pins, two pivot notches and two closed pivot notches. Thus, the lever body can be stably connected to the ring body.

In the invention, preferably, the ring body includes two projections, as the retaining clip, spaced apart from each other at the one end portion, and the latch tab includes two clipping slots holding the two projections of the ring body when the connecting lever is attached to the lever body.

Also, the ring body may further include a locating notch arranged to engage a locater tab of a hose. Further, the ring body may include inner and outer flex grooves to reduce torsional stresses during clamping.

BRIEF DESCRIPTION OF THE DRAWINGS

The present invention will be more understood by referencing the following descriptions in conjunction with the accompanying drawings, in which:

FIG. 14(a) shows an isometric view of the air intake hose, and FIG. 14(b) shows an enlarged view of a part of FIG. 14(a).

FIG. 23(a) and FIG. 23(b) show side views of the hose clamp where different levers are used.

DETAILED DESCRIPTION OF THE INVENTION

The following detailed description is exemplary in nature and is not intended to limit application and uses. Further-more, there is no intention to be bound by any theory presented by the following detail.

Figure 1:
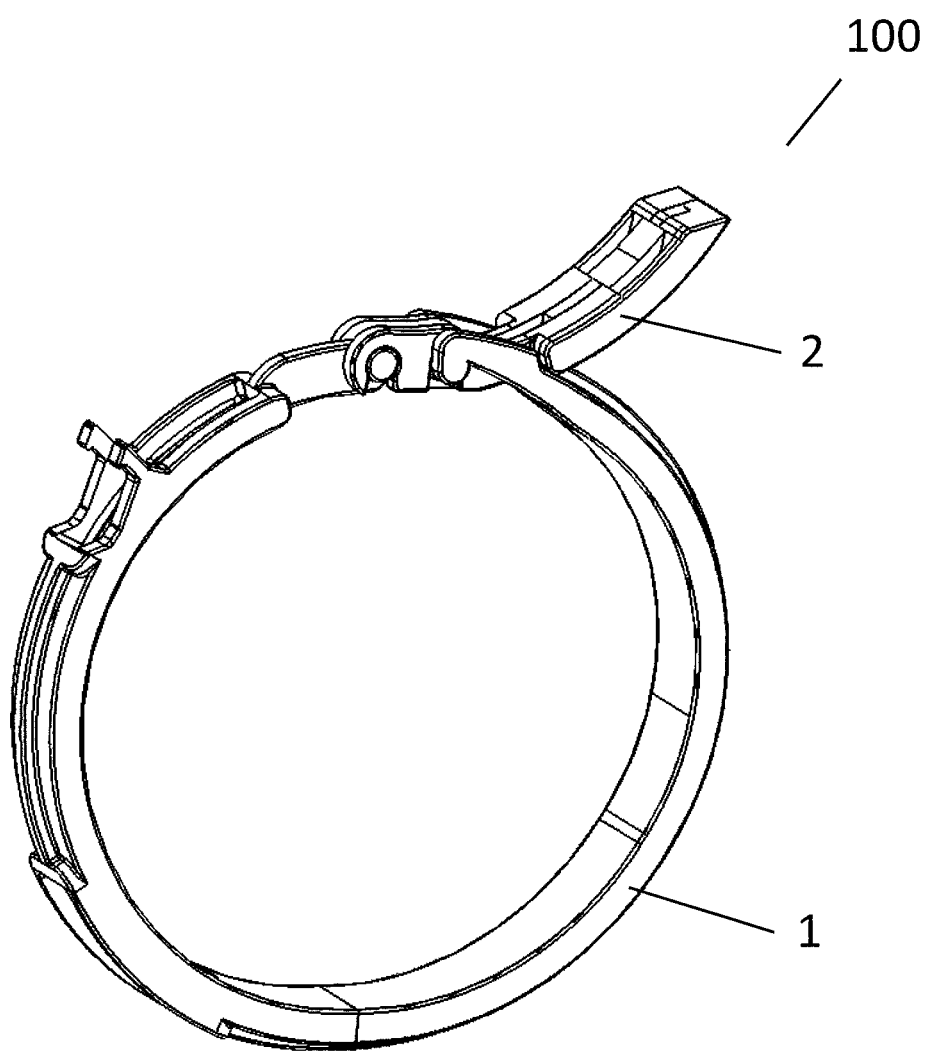
FIG. 1 shows an isometric view of a hose clamp of the invention wherein the clamp is opened.

FIG. 1 shows an isometric view of a hose clamp 100 in an open or unlocked position before the lever 2 has been rotated about the pivot points on the ends of the ring 1, i.e. a lever is rotated into the closed or locked position.

Figure 2:
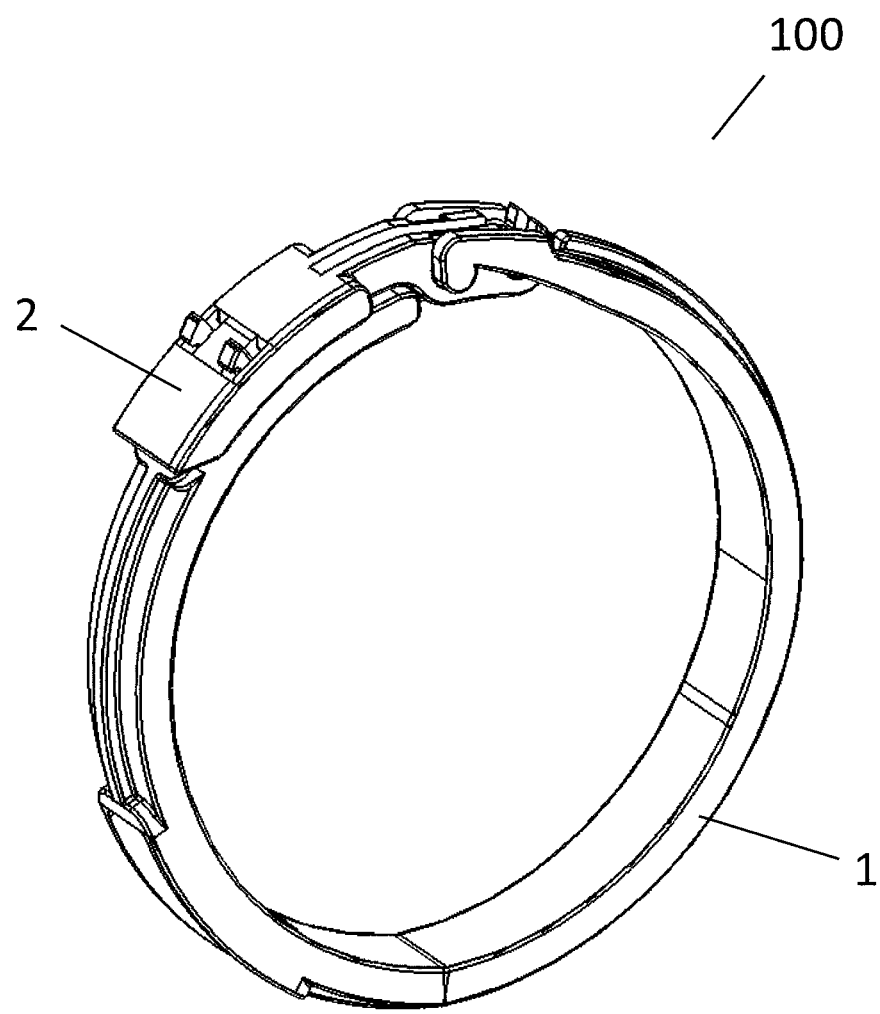
FIG. 2 shows an isometric view of the hose clamp wherein the clamp is closed or tightened.

FIG. 2 shows an isometric view of the hose clamp 100 in the closed or locked position after the lever 2 have been rotated about the pivot points of the ends of the ring 1 pulling one end of the ring 1 over to pass the other end of the ring 1 creating a camming mechanism which reduces the inner diameter of the ring 1.

Figure 3:
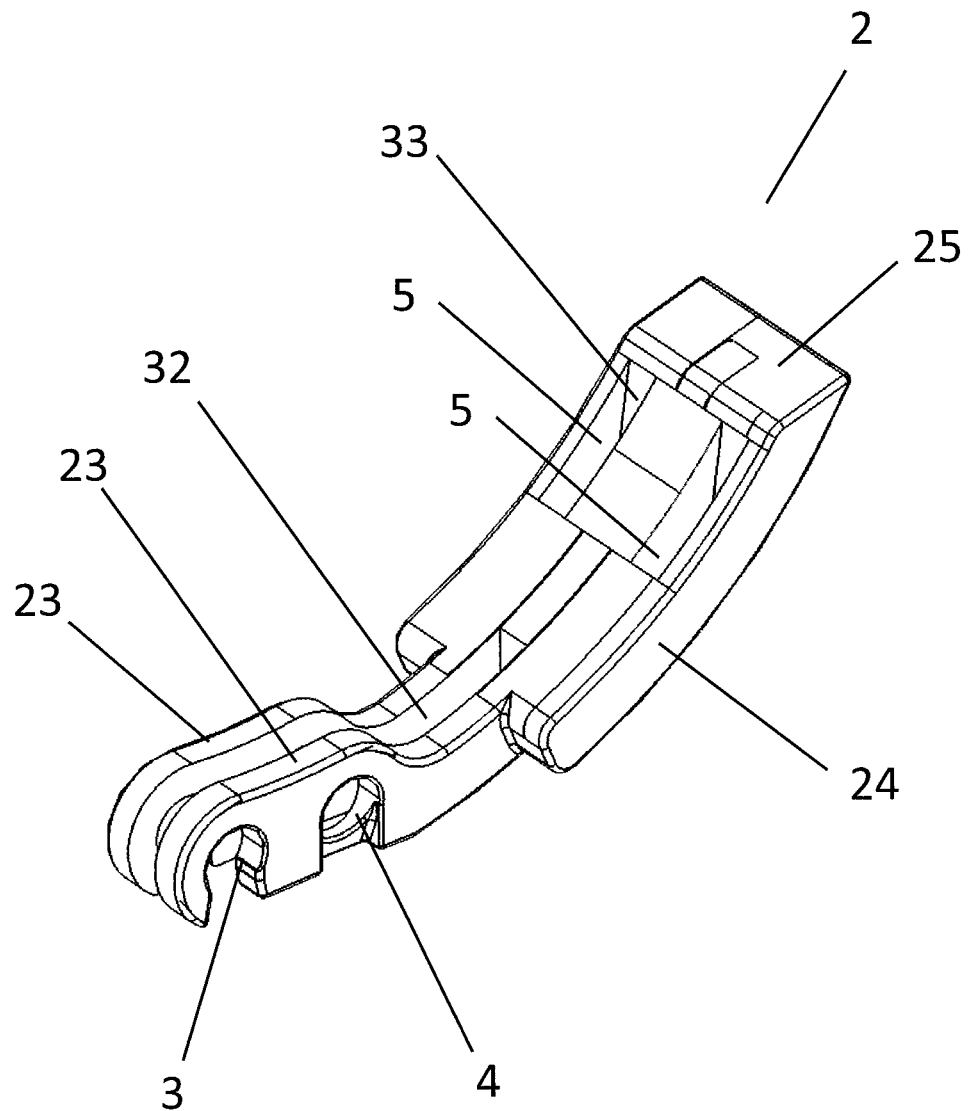
FIG. 3 shows an isometric view of a lever of the hose clamp from one side thereof.
Figure 4:
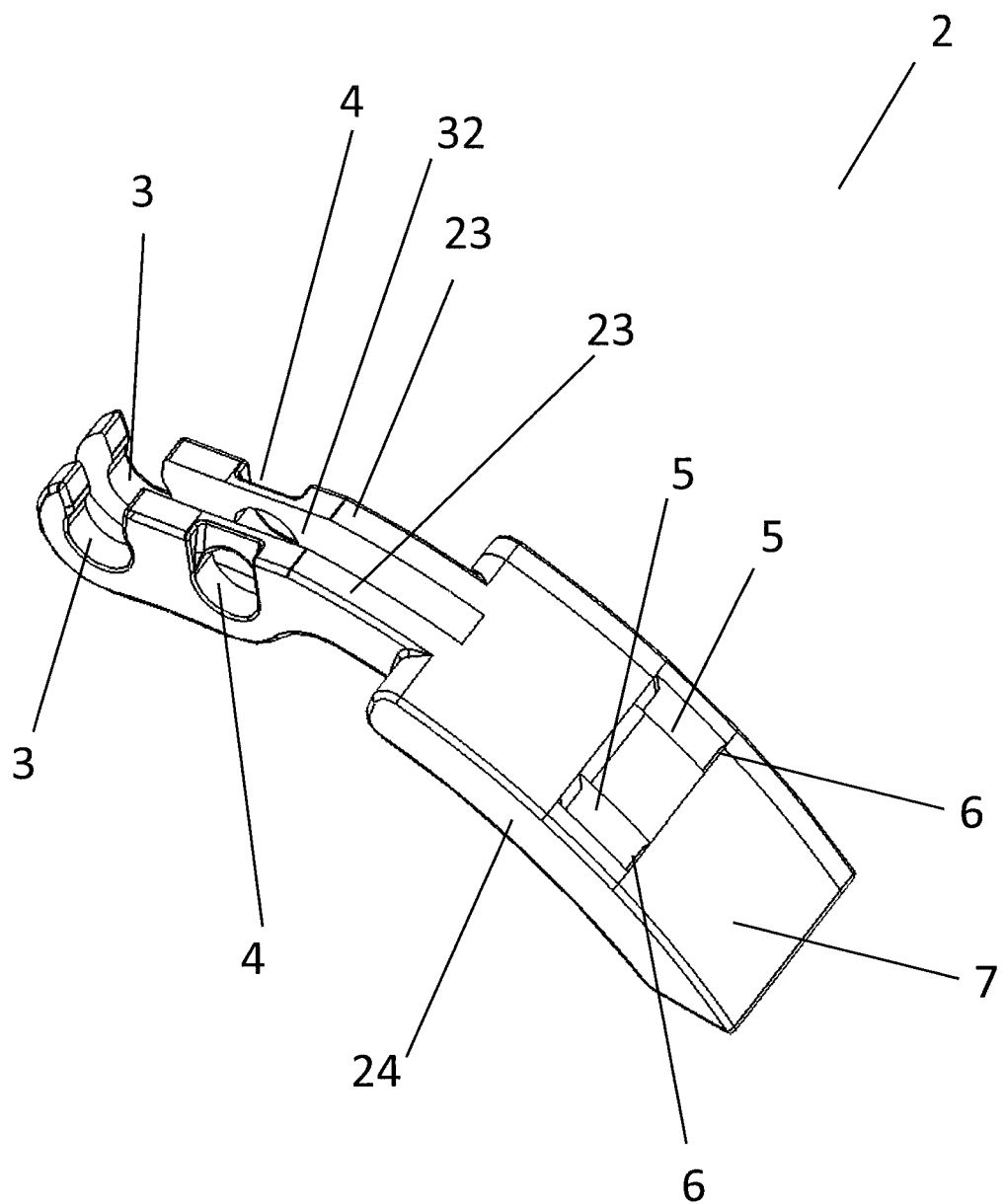
FIG. 4 shows an isometric view of the lever of the hose clamp from another side thereof.

FIG. 3 and FIG. 4 show the lever 2 comprising a latch tab 24 at one end and two pivot arms 23 on the other end. Each pivot arm 23 has two pivot notches, i.e. an open pivot notch 3 at the far tip and a closed pivot notch 4, spaced apart from one another with an open slot 32 therebetween. The latch tab 24 has an angled release surface 25 at its far tip and a slot surface 33. Two clip slots 5 are formed on both sides of the slot surface 33.

Figure 5:
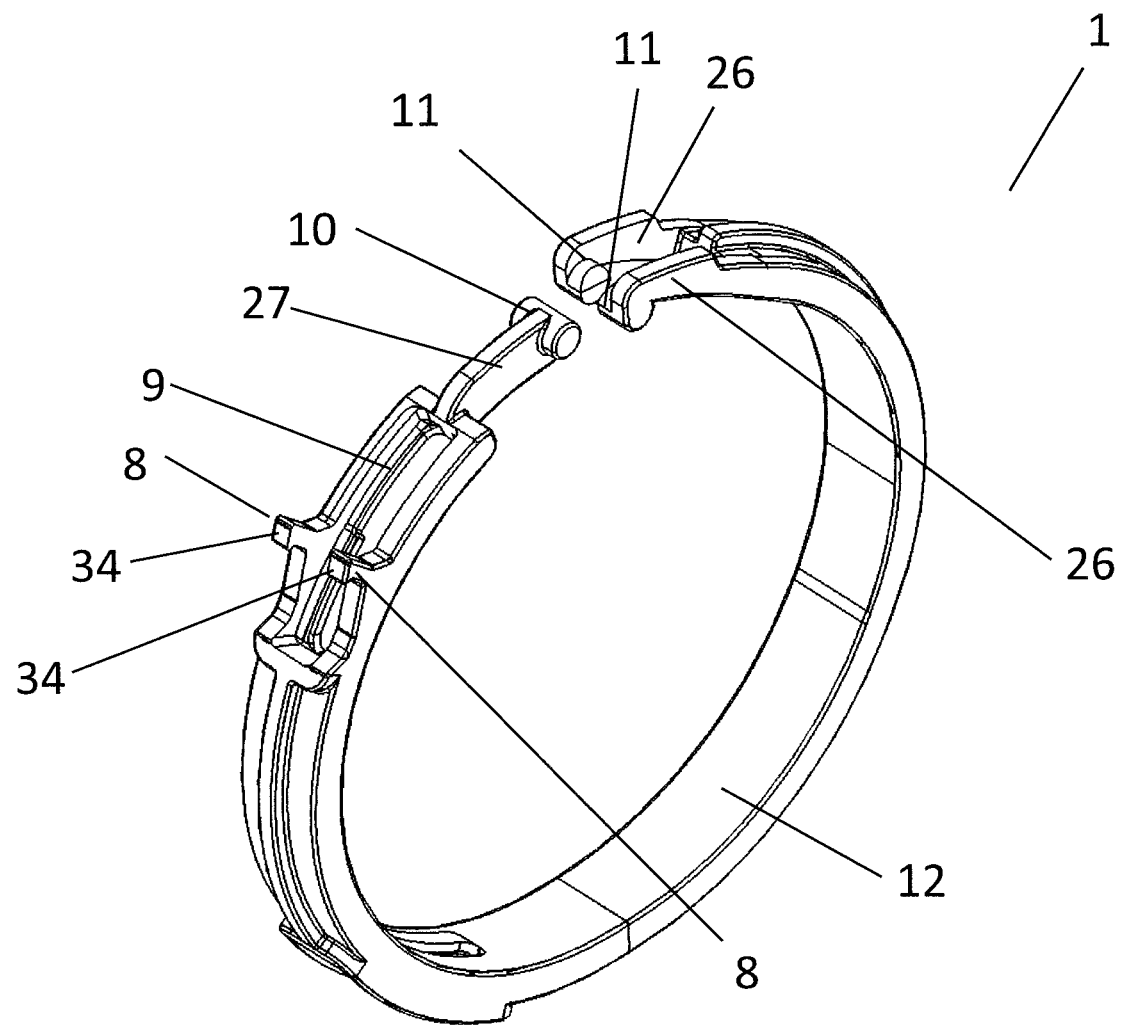
FIG. 5 shows an isometric view of a ring of the hose clamp seen from one side.
Figure 6:
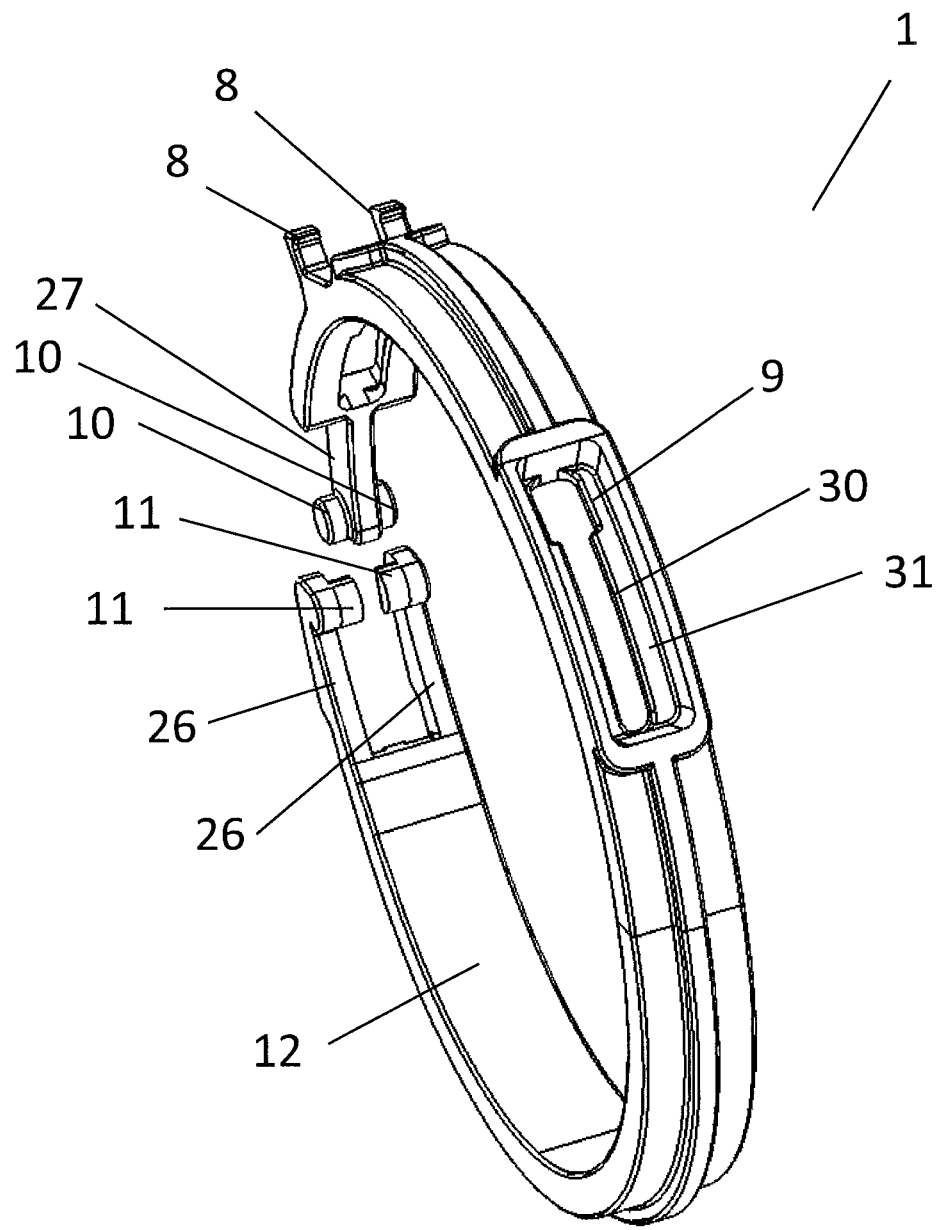
FIG. 6 shows an isometric view of the ring seem from another side.

As shown in FIG. 5 and FIG. 6, the ring 1 has an inner surface 12. The ring 1 includes an open ring shape with a single pivot arm 27 centrally located at one end of the ring 1 and dual pivot arms 11 located at the outer edges of the other end of the ring 1. The single pivot arm 27 has pivot pins 10 at both sides of the pivot arm protruding outward therefrom. The dual outer pivot arms 26 have pivot pins 11 at their tips protruding inward. The ring 1 also has a locating notch 9, a rib guide 30, a flange guide 31 and retaining clips 8 located at a side of the pivot arm 27. The retaining clips 8 have retaining surfaces 34.

Figure 7:
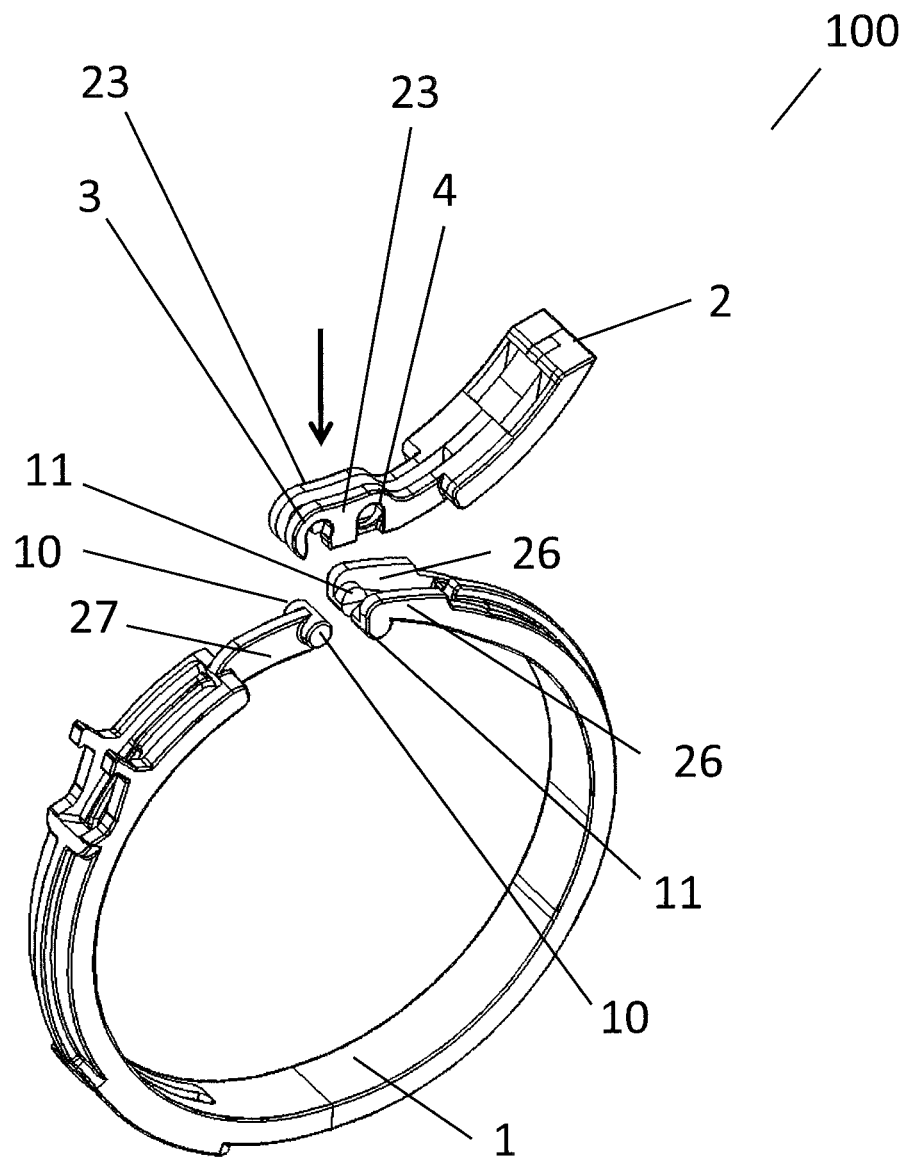
FIG. 7 shows an exploded isometric view of the hose clamp.
Figure 8:
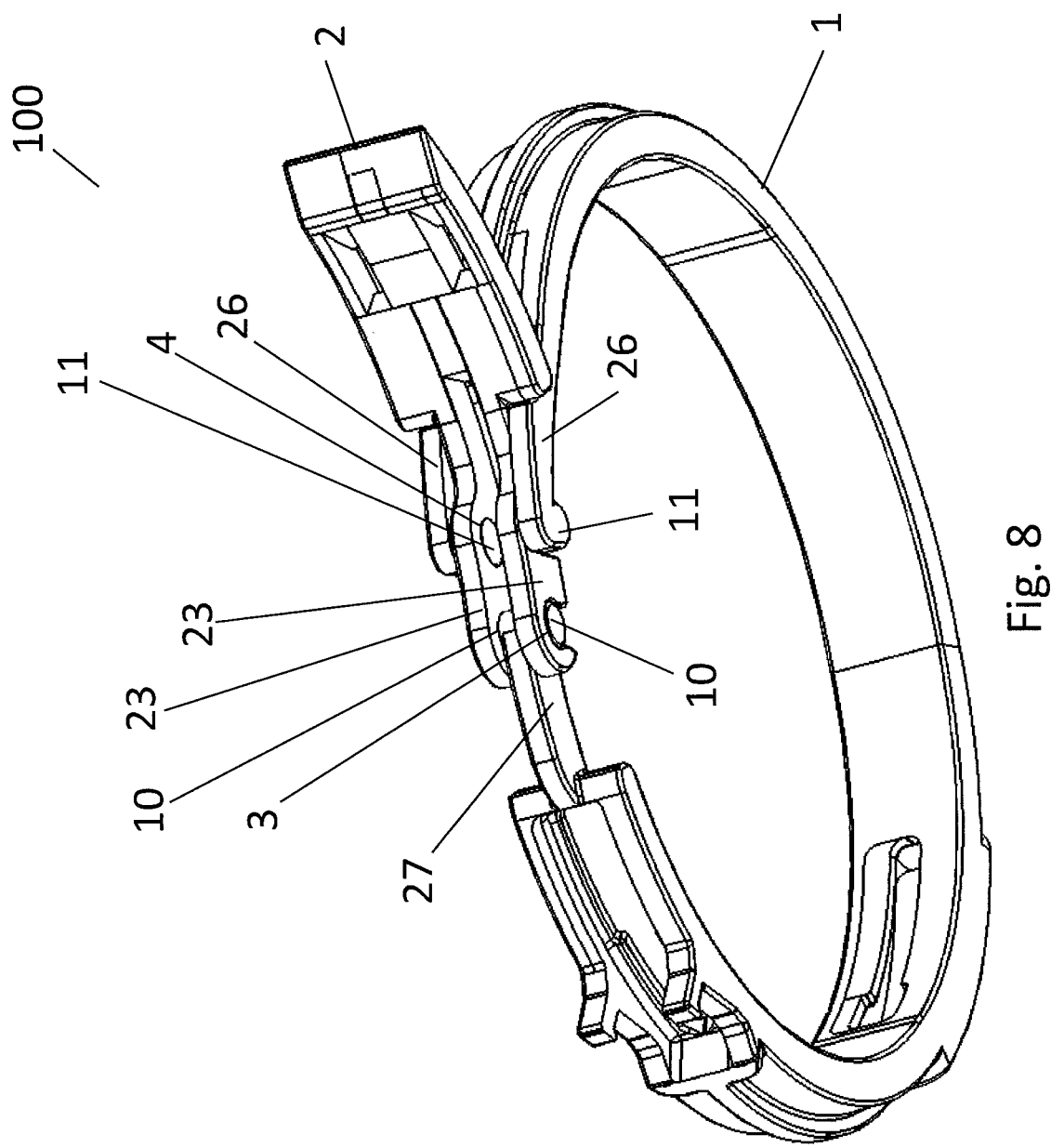
FIG. 8 shows an isometric view of the hose clamp.
Figure 9C:
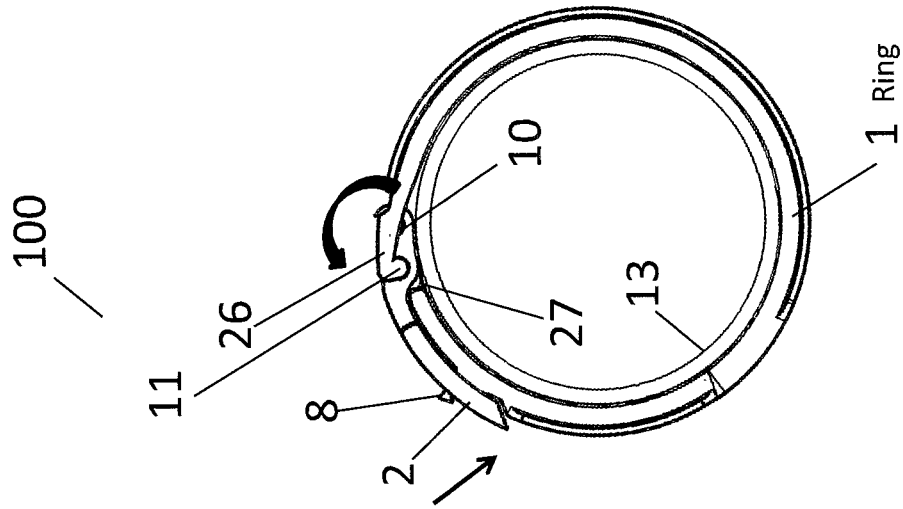
FIGS. 9(a)-9(c) show side views of the hose clamp wherein the lever is turned.
Figure 9B:
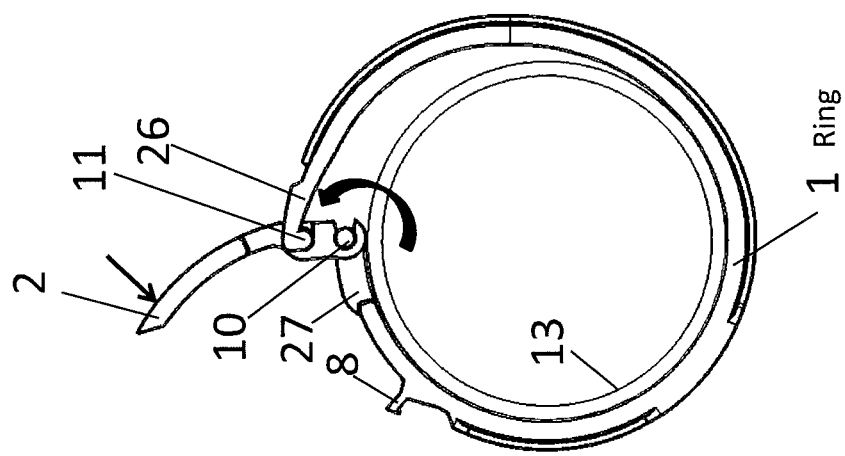
Figure 9A:
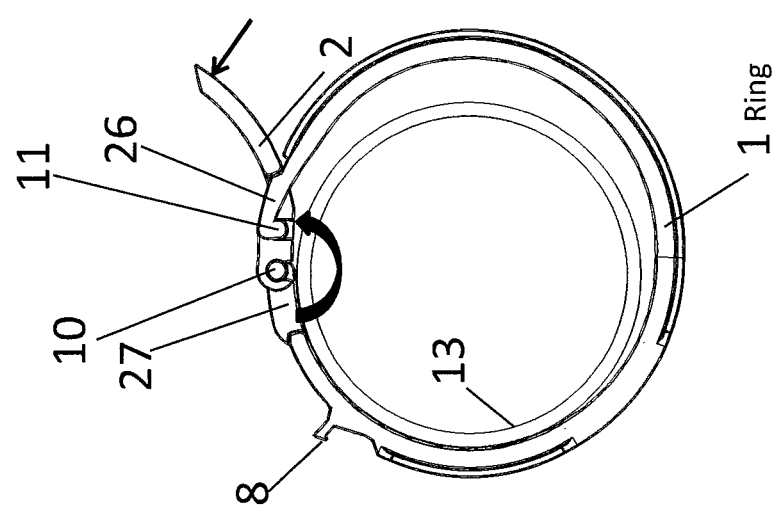

An assembly process of the hose clamp 100 is shown in FIGS. 7 and 8. The ring 1 is located with the open portion of the ring shape facing upward, and the lever 2 is positioned above the ring 1 with the pivot notches facing downward, so that the lever 2 can be assembled to the ring 1. The open pivot notches 3 of the lever 2 are aligned to the pivot pins 10 of the ring 1 while the pivot arm 27 of the ring 1 is positioned between the two pivot arms 23 of the lever 2. Pressure is applied to the lever 2, forcing the open pivot notches 3 to flex apart allowing the pivot pins 10 to snap into the lever 2 securing it into place. The closed pivot notches 4 of the lever 2 are then aligned to the pivot pins 11 of the ring 1 while the pivot arms 23 of the lever 2 are positioned between the pivot arms 26 of the ring 1. Pressure is applied to the lever 2, forcing the closed pivot notches 3 onto the pivot pins 11 flexing the pivot arms 26 of the ring 1 outward allowing the pivot pins 11 to snap into the lever 2 securing it into place. Thus, as shown in Fi. 8, the lever 2 is attached to the ring 1.

The functional operation of closing or locking the hose clamp 100 is shown in FIGS. 9(a) to 9(c) and FIGS. 10(a) and 10(b). When closing the lever 2, pressure is applied to the outer tab surface 7 of the lever 2 forcing the open notches 3 of the lever 2 to rotate about the pivot pins 10 on the end of the ring 1 (FIG. 9(a)). As the lever 2 rotates about the pivot pins 10 on one end of the ring 1, the pivot pins 11 on the other end of the ring 1 are rotated up and over the pivot pins 10 as they rotate within the closed notches 4 of the lever 2 (FIG. 9(b)). This causes the shape of the ring 1 to flex and begin being pulled tight around the air intake hose 13. The lever 2 continues to rotate about the pivot pins 10 until the pivot pins 11 are on the opposite side of the pivot pins 10 from the position where they started (180 degrees), thereby pulling the ring 1 tight around the intake hose 13 (FIG. 9(c)).

Figure 10A:
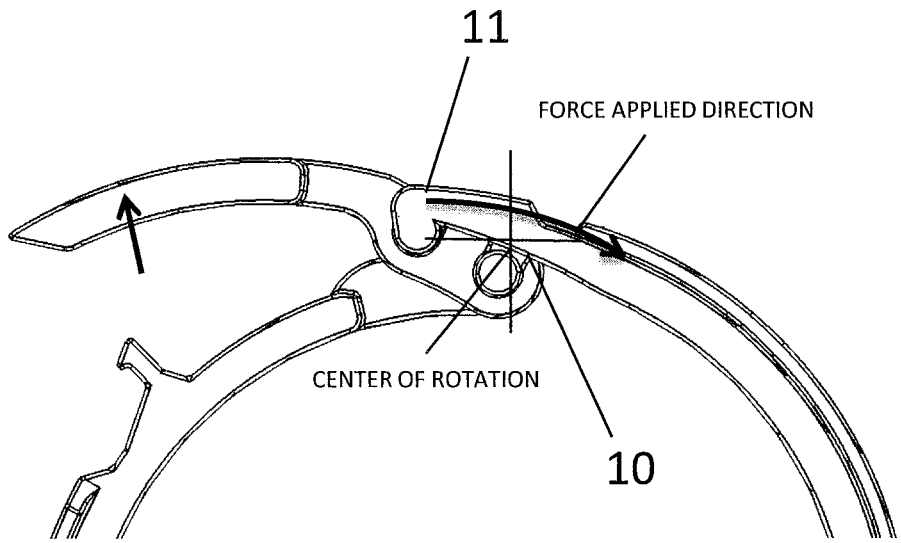
FIGS. 10(a) and 10(b) show side views of the hose clamp when the lever is turned.
Figure 10B:
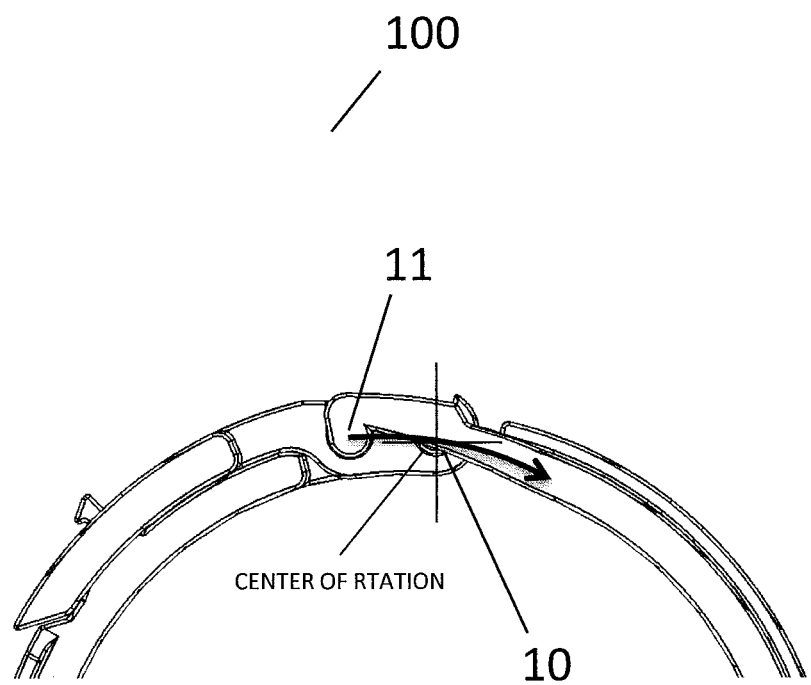

With the pivot pins 11 in this new 180 degree position, the ring 1 cannot be pulled open with pressure applied upward front the center of the ring 1 as the pivot pins 11 are past the center of rotation (see FIG. 10b). When the ring 1 is pulled, the pivot pins 11 are pulled towards the pivot pins 10 not allowing the lever 2 to be rotated. The lever 2 must be lifted until the pivot pins 11 are above the center of rotation to allow pressure from the center of the ring 1 to open the hose clamp 100. To ensure that the lever 2 doesn't rotate after being located in the closed or locked position, the retaining clips 8 are located on the ring 1 securing the hose assembly 100.

Figure 11:
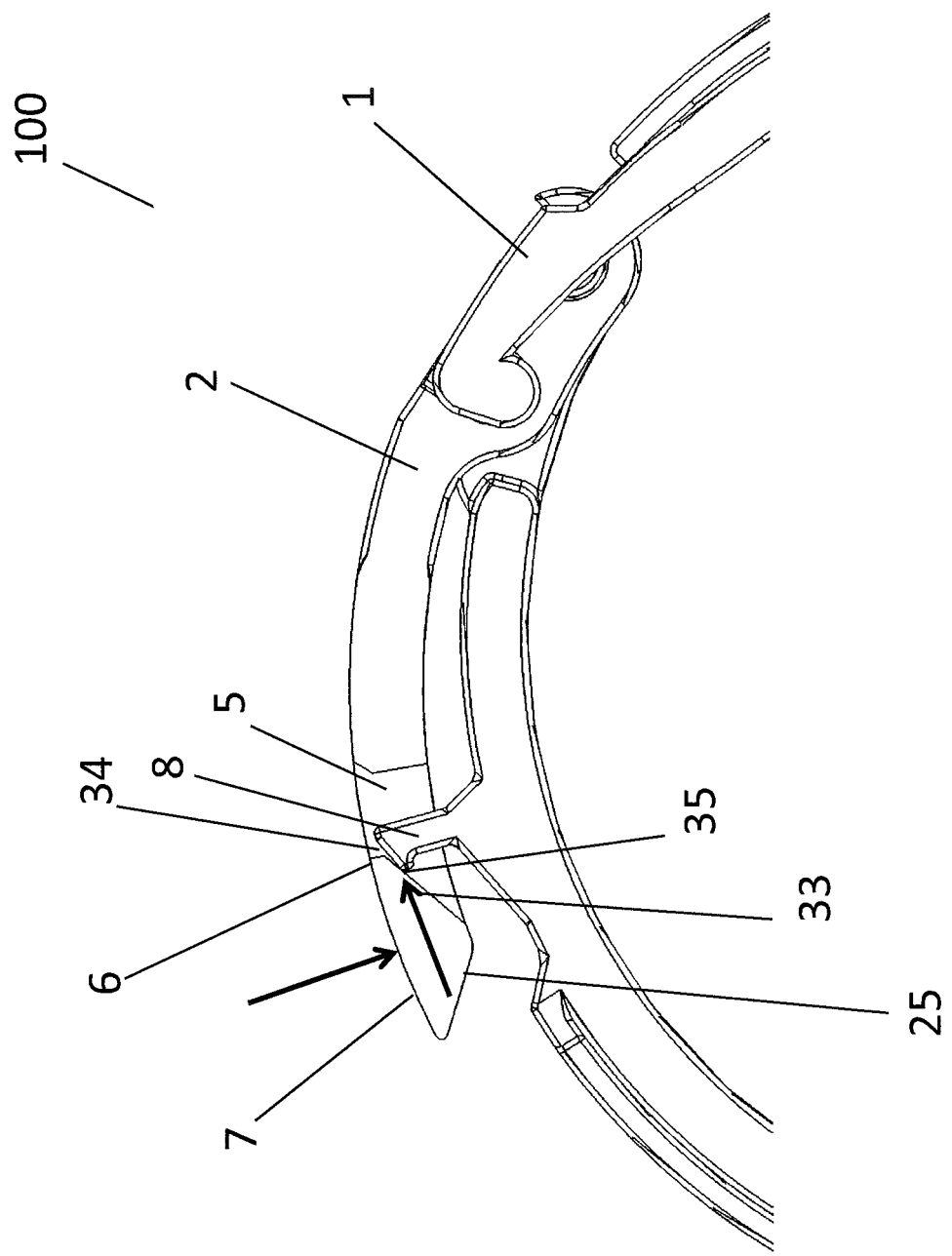
FIG. 11 shows a side view of the hose clamp before the lever is clamped.
Figure 12:
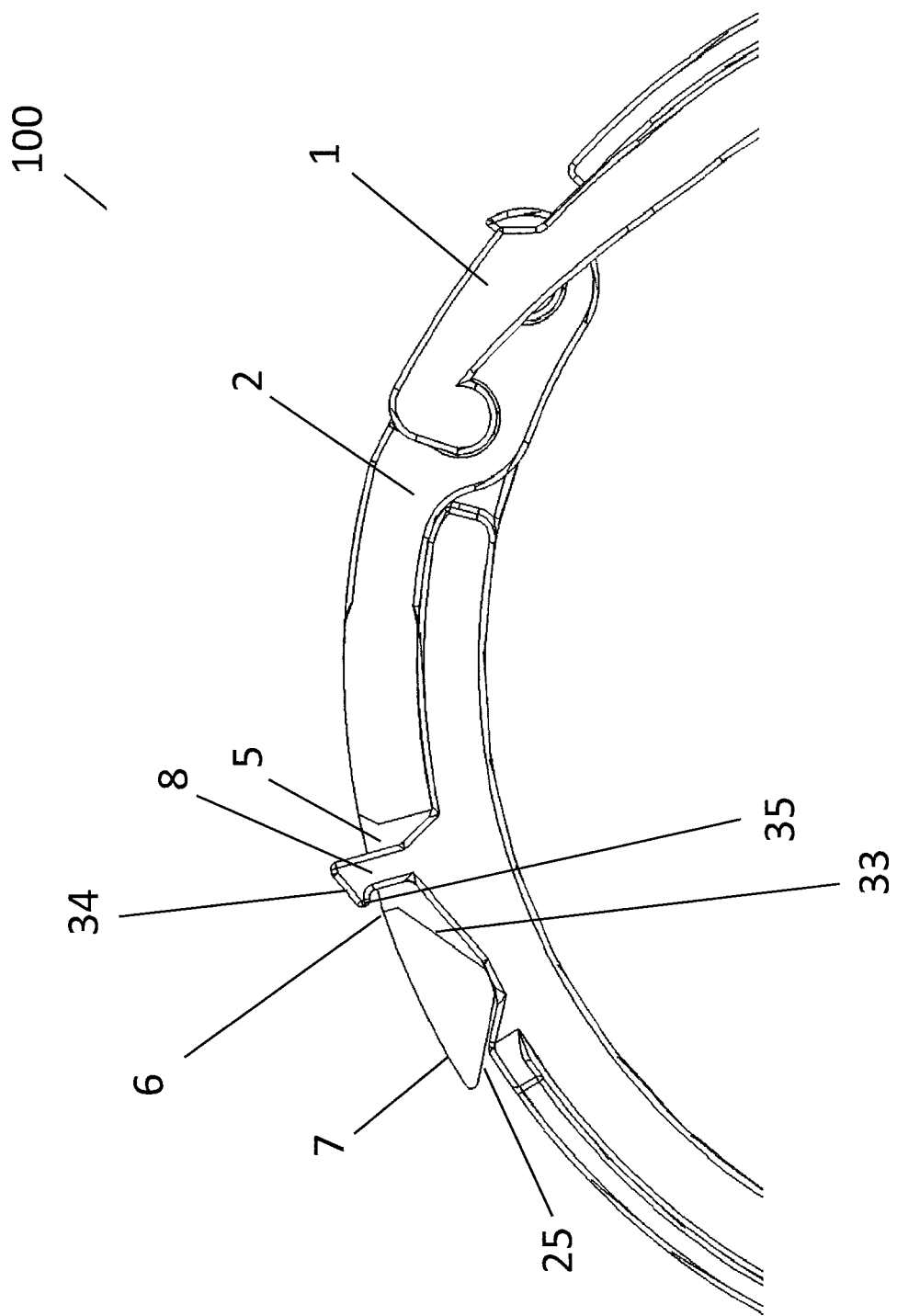
FIG. 12 shows a side view of the hose clamp when the lever is moved from a condition shown in FIG. 11.
Figure 13:
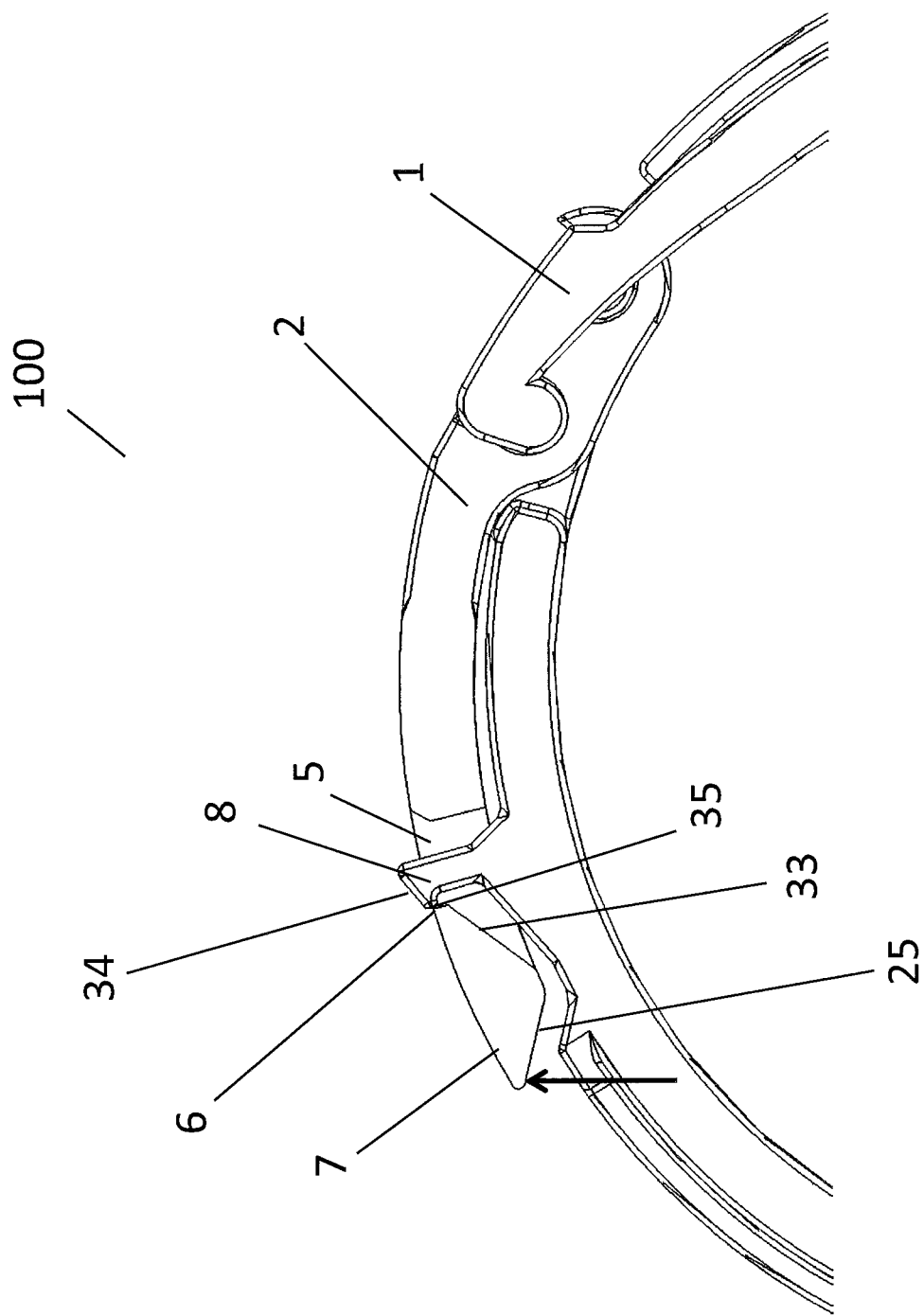
FIG. 13 shows a side view of the hose clamp when the lever is clamped.

FIG. 11 thru FIG. 13 show the functional operation of retaining and releasing of the lever 2 to open and close the hose clamp 100. When the lever 2 gets close to reach the 180 degree position, the retaining clips 8 on the ring 1 enter into the clip slots 5 of the lever 2. The retaining clips 8 move through the clip slots 5 until the retainer surface 34 contacts the slot surface 33 of the lever 2. Continued pressure on the outer tab surface 7 of the lever 2 forces the retaining clips 8 to flex out of the way of the slot surface 33 allowing the retainer catch 35 to travel up the retainer surface 34 out through the top of the clip slots 5. Once the retaining clips 8 exits thought the top of the lever 2, the retainer clips 8 snap back into their original position with an audible sound placing the retainer catch 35 sitting over the retaining lip 6 on the lever 2 securing it in place.

To open or unlock the hose clamp 100, pressure is applied to the release surface 25 on the lever 2 pushing the retaining lips 6 against the retainer catch 35 forcing the retainer clips 8 to flex out of the way of the retaining lip 6. Once the retaining lip 6 has moved past the retaining catch 35, the retaining clips 8 return to their original position.

FIGS. 14(a) and 14(b) show the hose clamp 100 locating and retaining features of an air intake hose 13. The air intake hose 13 has four locator ribs 17 with two placed at each end. Each of the two locator ribs 17 placed at one end and the two locator ribs 17 placed at other end forms a channel 36 which locates the hose clamps 100 to each end of the air intake hose 13. Within each channel 35, there are two locator tabs 15 placed around the outer hose surface 16 to secure the hose clamps 100 from rotating within the channels 36.

Figure 15:
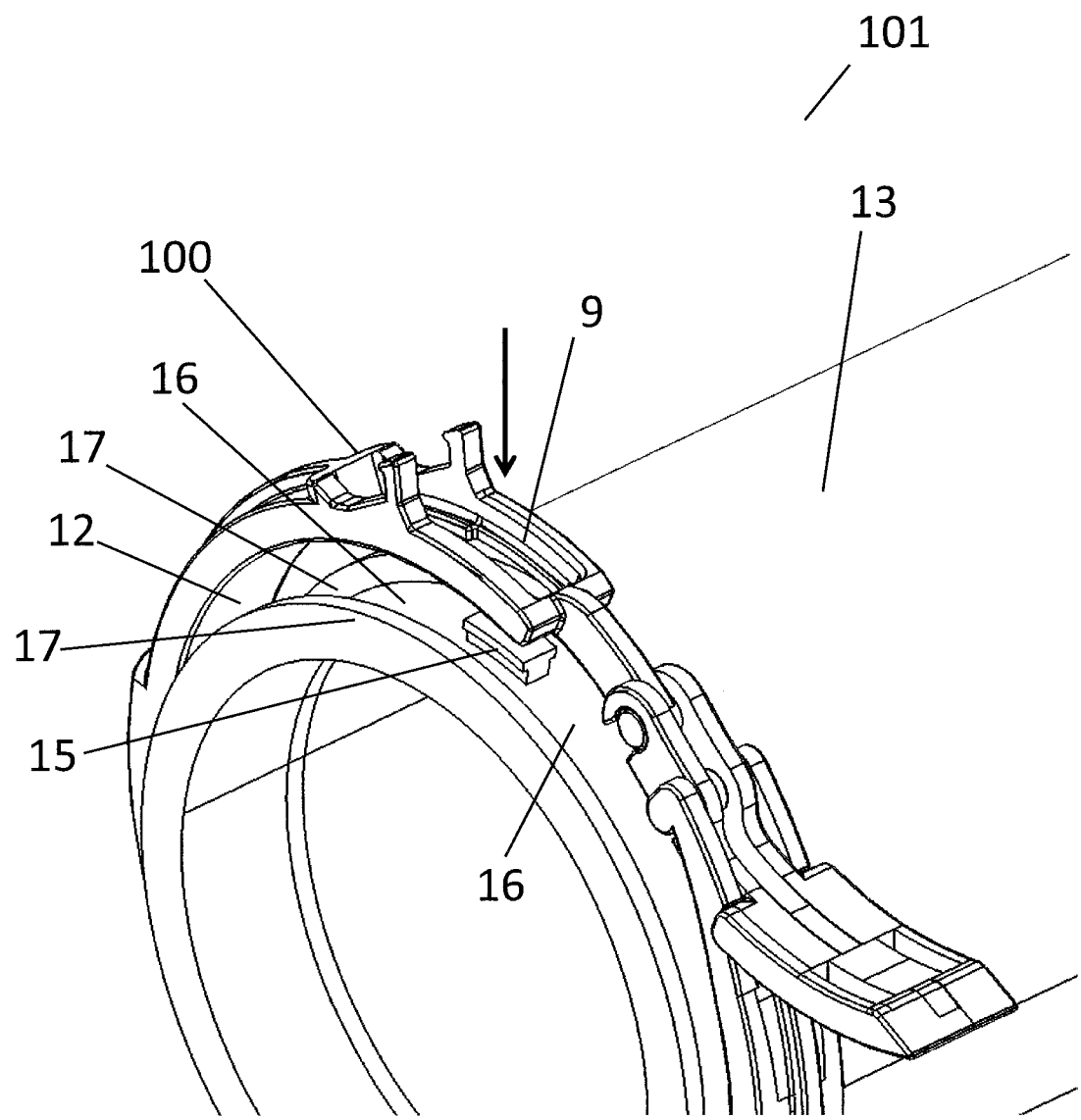
FIG. 15 to FIG. 17 show isometric views of the air hose intake assembly when the hose clamp is operated.
Figure 16:
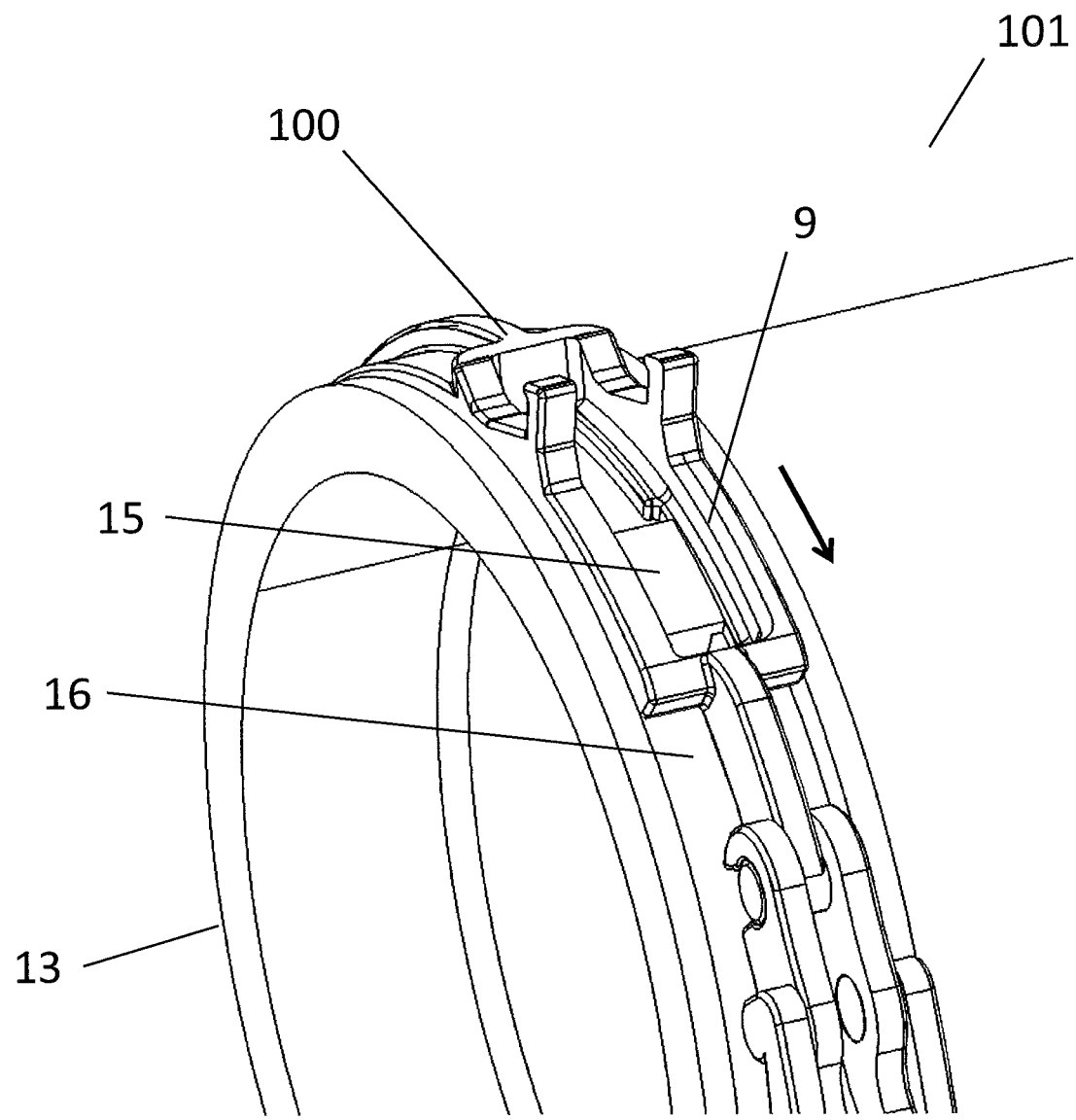
Figure 17:
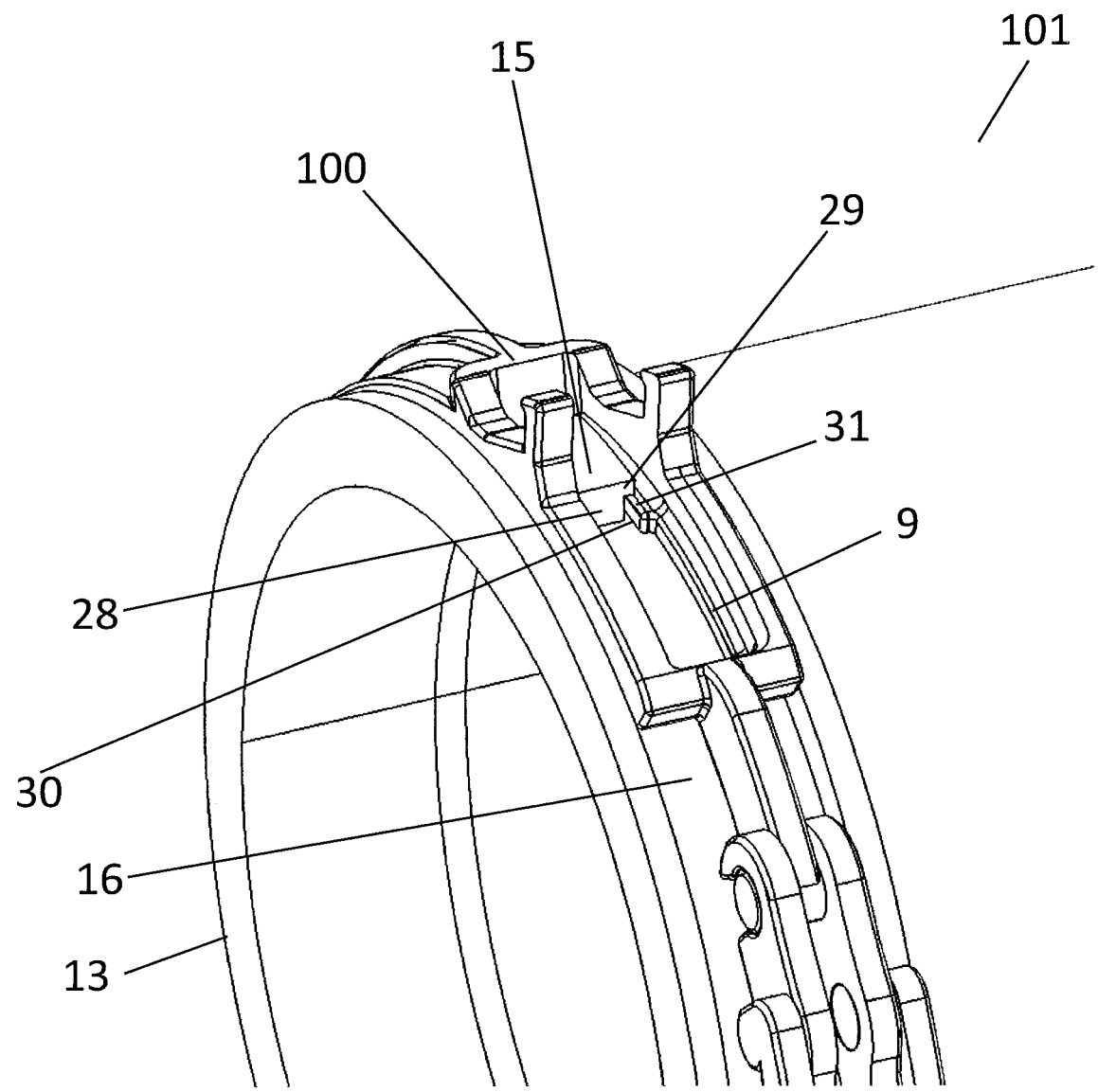
Figure 18:
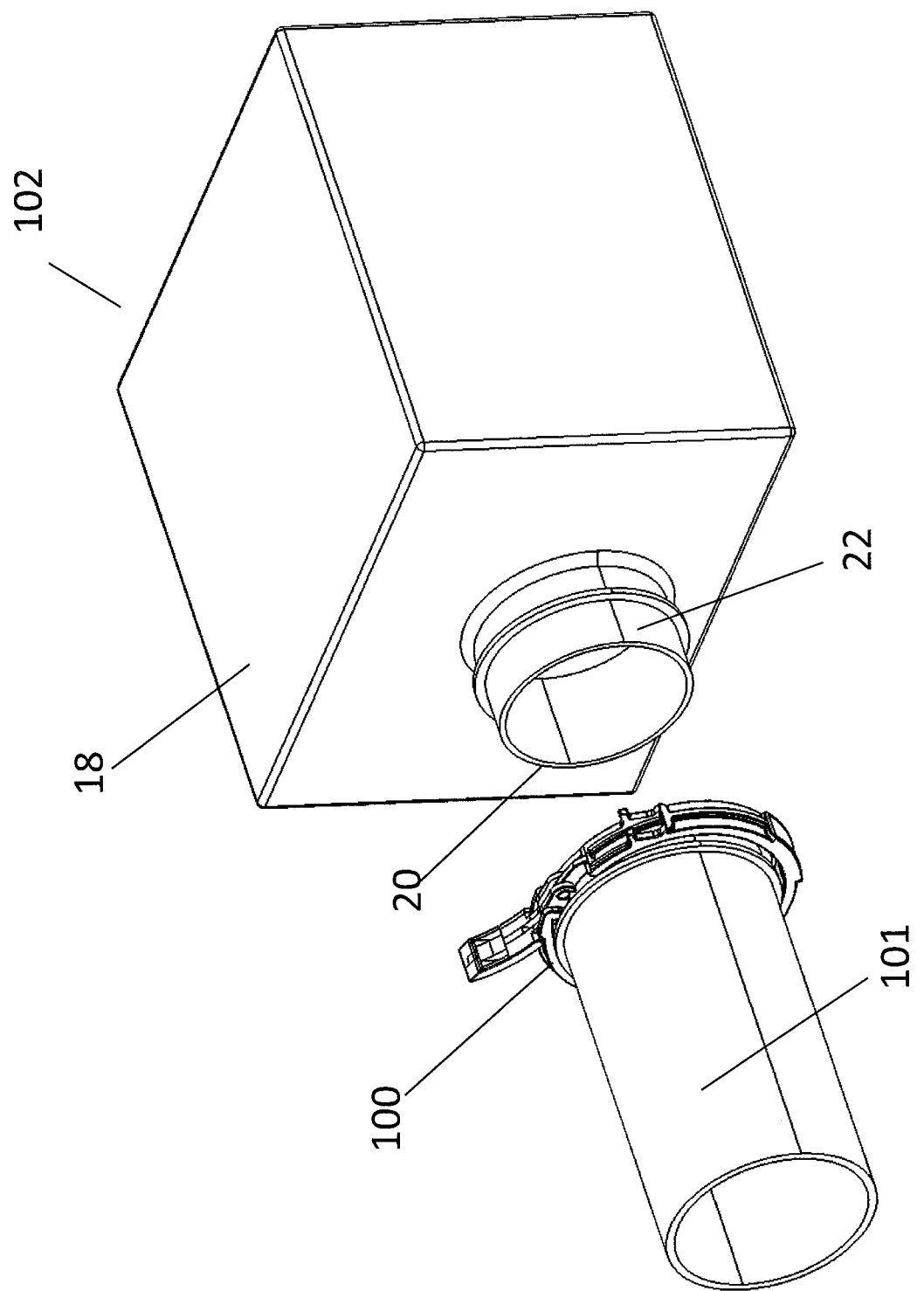
FIG. 18 to FIG. 21 show isometric views of the air hose installation assembly when the air hose assembly is attached to a filer enclosure.
Figure 19:
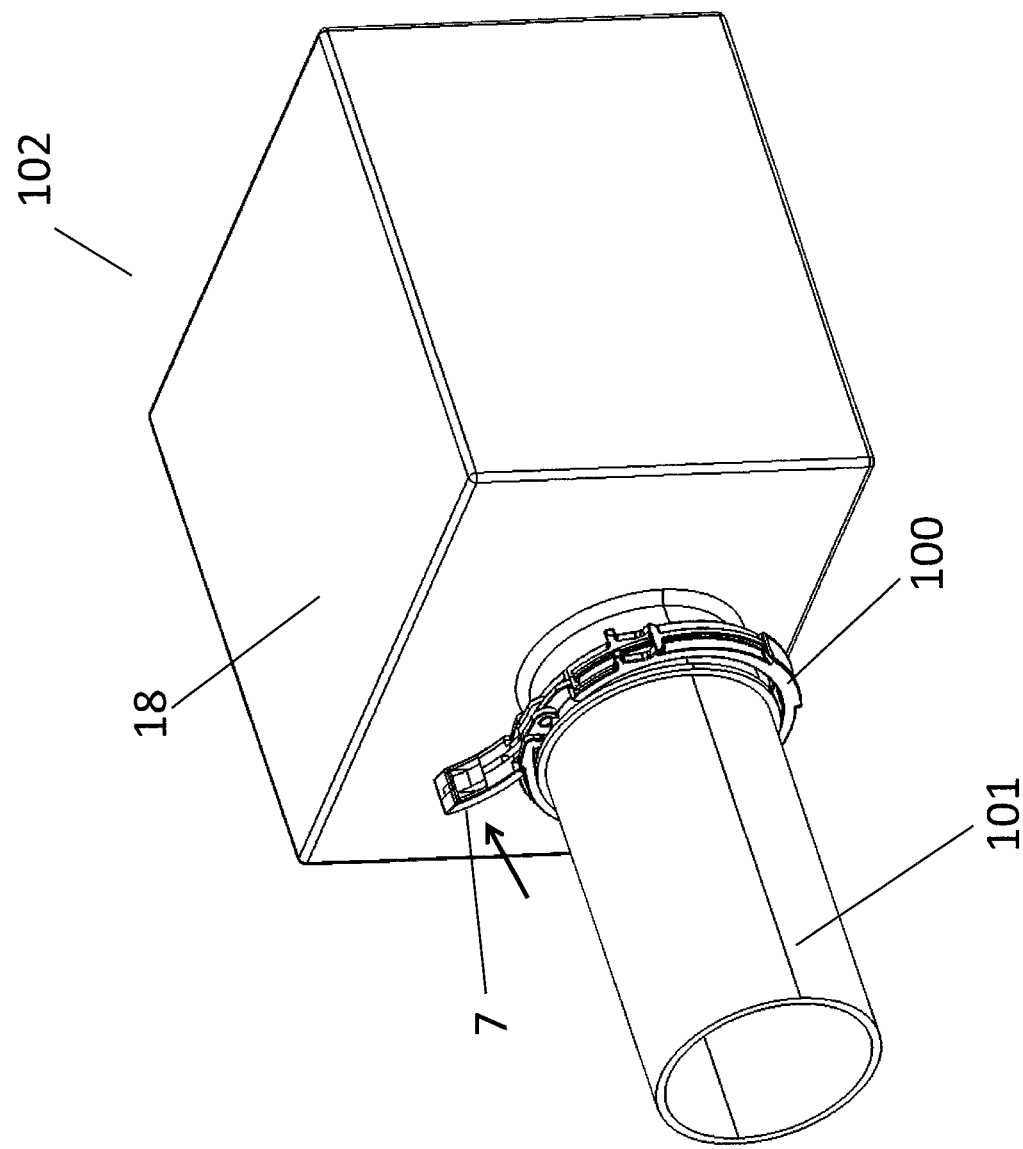
Figure 20:
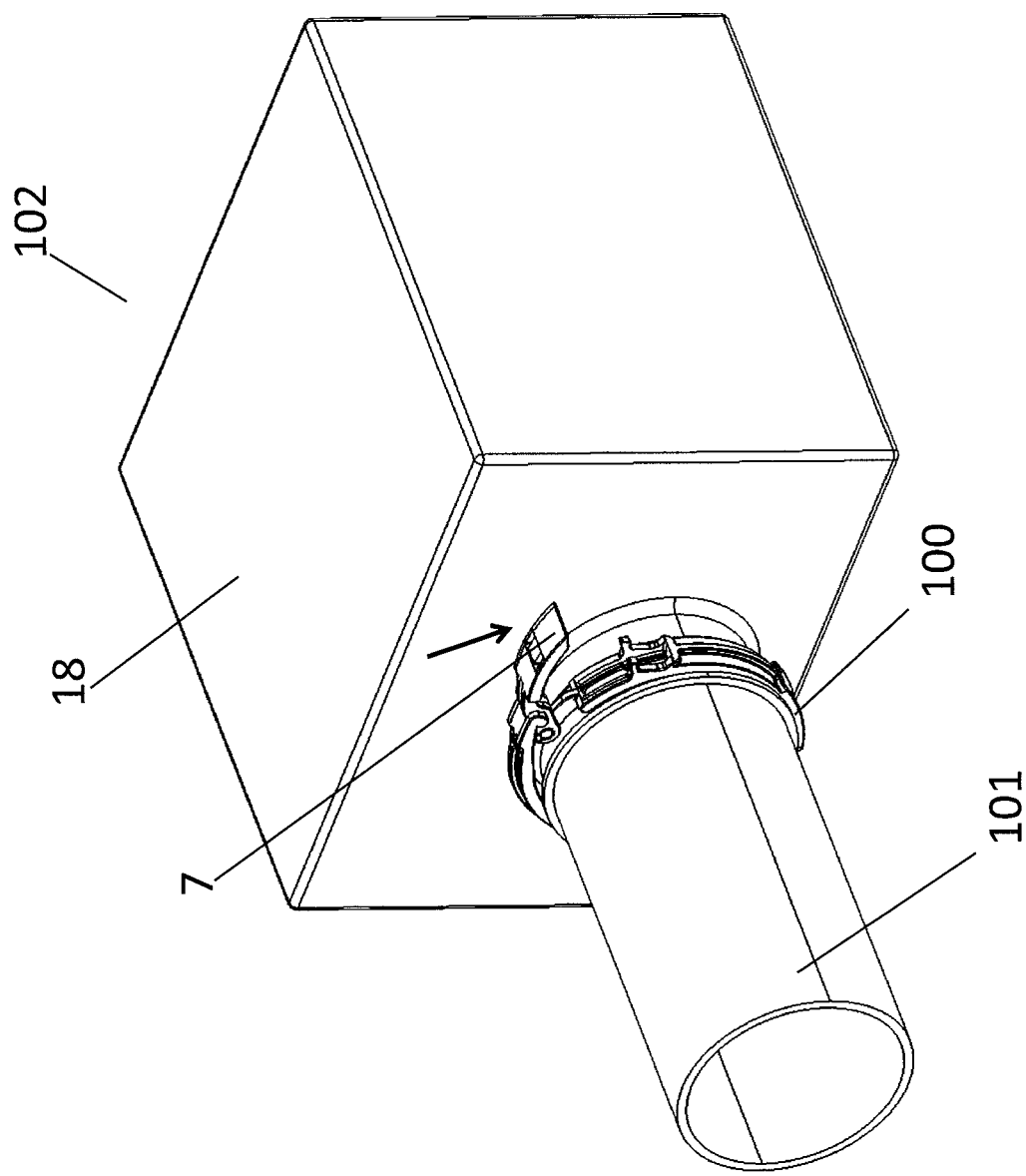
Figure 21:
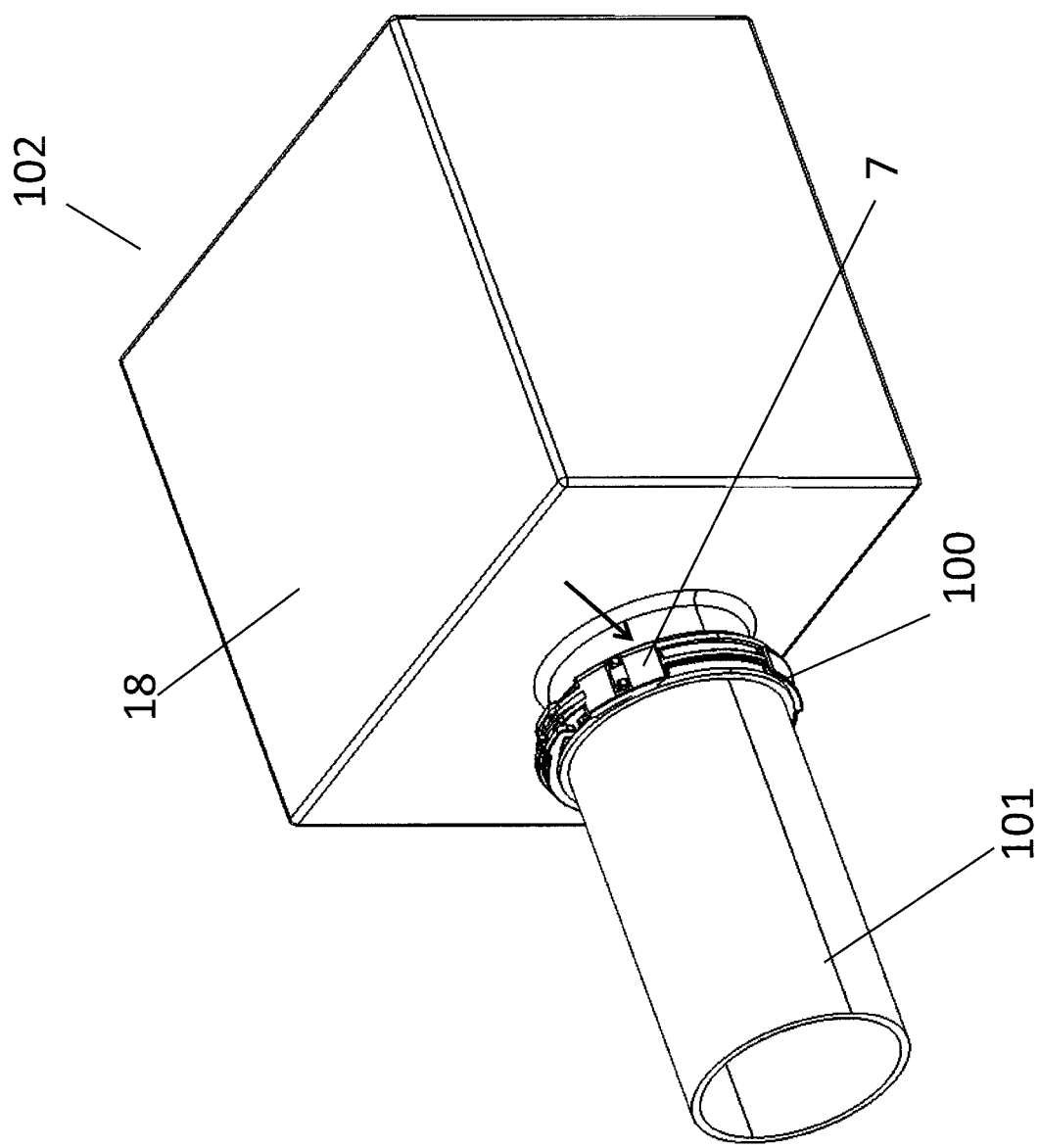

In FIG. 15 thru FIG. 17, functional operation of securing the hose clamp 100 to air intake hose 100 is shown. With the hose clamp 100 in its open or unlocked position, it is placed over the end of the air intake hose 13. With the air intake hose 13 made of a flexible rubber type material, the locator rib 17 located on the edge will deform its shape until the hose clamp 100 is located within the channel 36 between the first and second locator ribs 16. The locating notches 9 on the ring 1 of the hose clamp 100 are placed over the locator tabs 15 on the air intake hose 13 and pressed down until the inner ring diameter 12 of the ring 1 contacts the outer hose surface 16 on the air intake hose 13. With the locater tabs 15 of the air intake hose 13 protruding through the locating notch 9 on the ring 1, the hose clamp 100 is rotated clockwise around the air intake hose 13. As the hose clamp 100 is rotated, the rib guide 30 on the ring 1 aligns the ribs 28 of the locater tabs 15 on the air intake hose 13 to allow the flange guides 31 on the ring 1 to slide under the flanges 29 of the locater tabs 15. With the locater tabs 15 secured in place the hose clamp 100 will not rotate around the air intake hose 13 assuring that the lever 2 of the hose clamp 100 is located in the same position on the air intake assembly 101.

FIG. 18 thru FIG. 21 show the functional operation of securing the air hose assembly 101 to the air filter enclosure 18. The air intake hose assembly 101 is attached to the air filter enclosure 18 by sliding the inner hose surface 14 of the air intake hose 13 over the outer surface 22 of the air outlet 20 on the air filter enclosure 18 until the locater rib 17 on the end of the air intake hose 13 comes into contact with the locating rib 19 on the air outlet 20 on the air filter enclosure 18. With the air intake hose assembly 101 located on the air filter enclosure 18, pressure is applied to the contact surface 7 of the lever 2 engaging the camming mechanism of the lever 2 about the ring 1 until the retaining clips 8 snap onto the retaining lips 6 on the lever 2 locking the hose clamp 100 into the closed or locked position.

In the field of the invention, the diameter of the hose may be slightly different depending on the kind of the hose. In order to consider the situation, the hose clamp of the invention can be used for different diameter of hoses.

Figure 22:
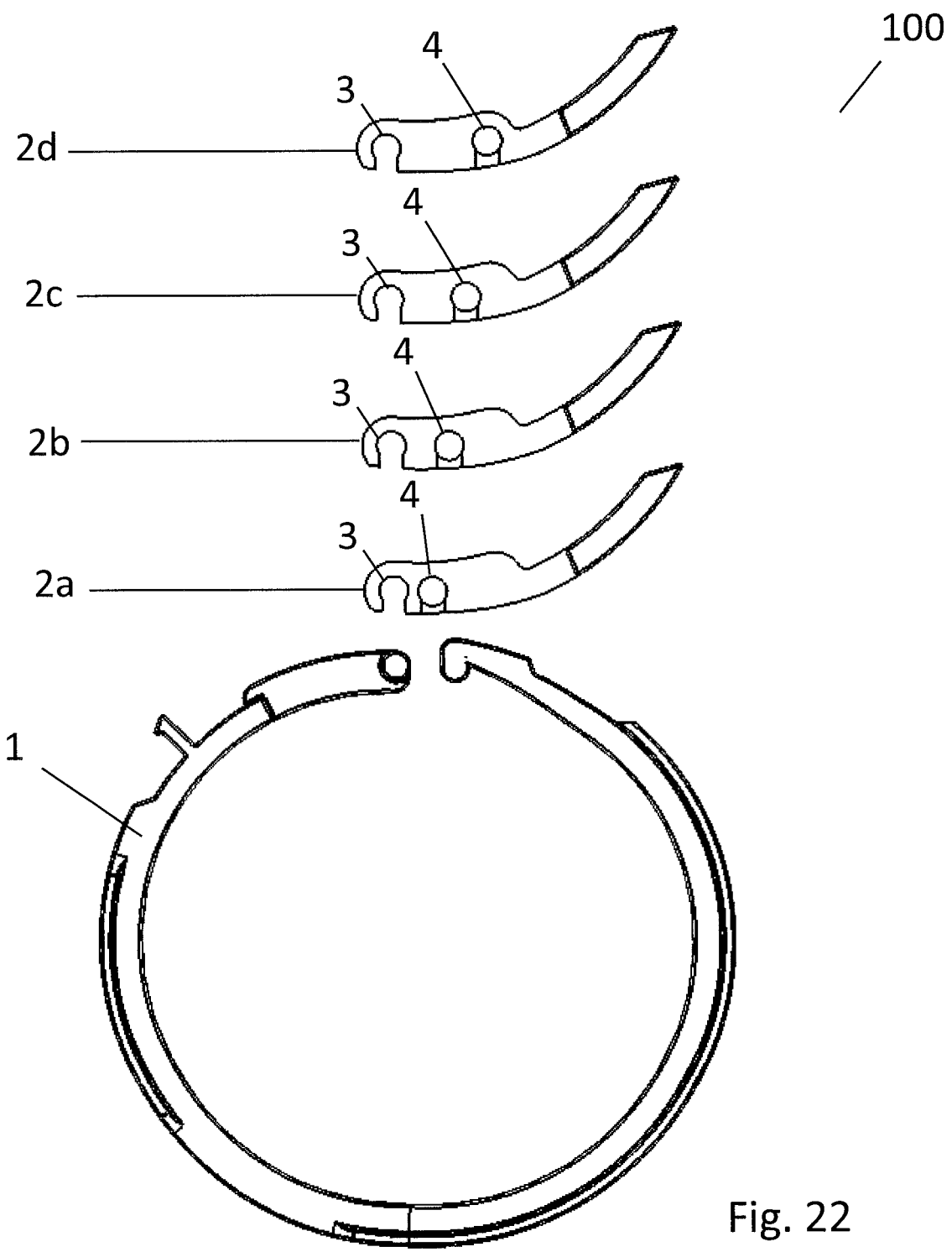
FIG. 22 shows a side view of the hose clamp with different levers.

FIG. 22 and FIG. 23 show the situation wherein the hose clamp 100 has the option of interchangeable levers 2 to achieve multipliable internal ring 1 diameters for use on different diameter air intake hoses 13. For the levers 2 to be interchangeable on the ring 1, the open pivot notches 3 and the clip slot 5 of the lever 2 (FIG. 4) must retain the same distance apart from each other to allow the lever 2 to rotate about the pivot pins 11 and still be secured by the retaining clip 8 on the ring 1. The distance between the open notches 3 and the closed pivot notch 4 on the lever 2 can be changed to achieve different internal ring 1 diameters (2a to 2d in FIG. 22). As the closed pivot notches 4 are located closer to the open pivot notches 3 on the lever 2, the internal diameter of the hose clamp 100 when being clamped becomes larger, and as the closed pivot notches 4 are located away from the open pivot notches 3 on the lever 2, the diameter of the hose clamp 100 becomes smaller.

Figure 24:
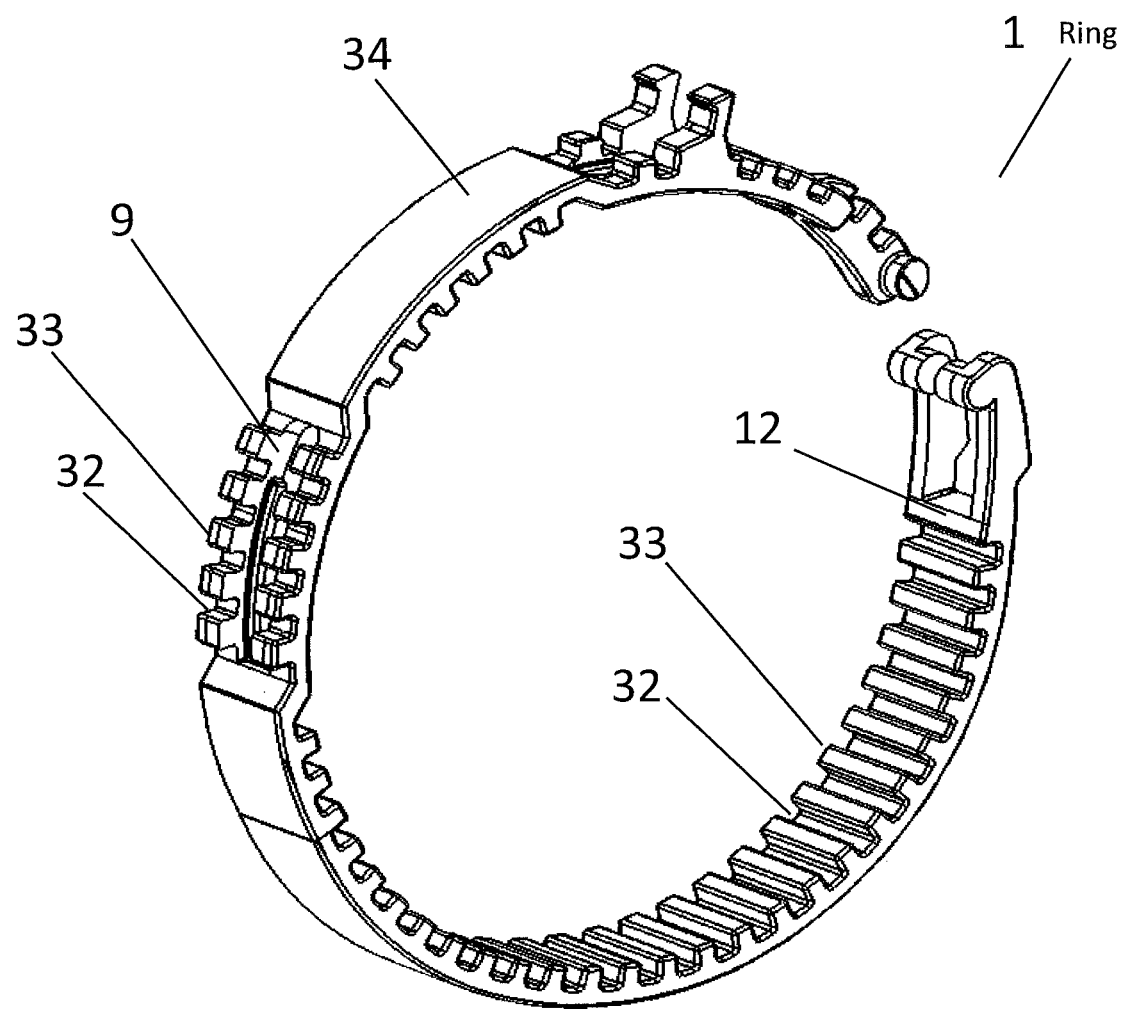
FIG. 24 shows an isometric view of another ring.

FIG. 24 shows an optional flex grooves 32 in the ring 1. Flex grooves 32 are located on the inner ring diameter 12 of the ring 1 creating spaced flex tabs 33 facing inward towards the center of the ring 1 except in the areas with locating notches 9. The areas where the locating notches 9 (FIG. 5) are formed have the flex grooves 32 with spaced flex tabs 33 facing outward away from the center of the ring 1. The combination of flex grooves 32 and flex tabs 33 allow the resin material to flex without causing consistent torsional stress on the body of the ring 1.

While only selected embodiments have been chosen to illustrate the present invention, it will be apparent to those skilled in the art from this disclosure that various changes and modifications can be made herein departing from the scope of the invention as defined in the appending claims. For example, the size, shape, location or orientation of the various components can be changed as needed. The foregoing descriptions of the embodiments according to the present invention are provided for illustration only, and not for the purpose of limiting as defined by the appended claims and their equivalents.

What is claimed is:

1. A hose clamp, comprising:

an open ended ring body including a first engagement pin located at one end portion of the ring body, a second engagement pin located at another end portion of the ring body, and a retaining clip located adjacent the first engagement pin; and a connecting lever detachably attached to the ring body, and including a lever body having a first pivot notch located on one end of the lever, a second pivot notch spaced away from the first pivot notch, and a clipping slot located at another end of the lever, wherein the first notch of the lever is connected to the first engagement pin of the ring and the second notch is connected to the second engagement pin of the ring so that when the lever is rotated relative to the ring body, the first notch of the lever pivots around the first engagement pin of the ring and the second notch of the lever pulls the second engagement pin on the ring over and around the first engagement pin of the ring body, and then, the retaining clip enters the clipping slot.

2. A hose clamp according to claim 1, wherein the ring body further includes a pivot arm at the one end portion, two first pivot pins, as the first engaging pin, provided on two sides of the pivot arm, two pivot arms at the another end portion with a space therebetween, and two second pivot pins, as the second engaging pin, provided on inner surfaces of the two pivot arms.

3. A hose clamp according to claim 2, wherein the lever body includes two lever pivot arms with a space therebetween, two open pivot notches, as the first pivot notch, to engage the first pivot pins, two closed pivot notches, as the second pivot notch, to engage the two second pivot pins, and a latch tab attached to the two lever pivot arms and having the clipping slot therein.

4. A hose clamp according to claim 3, wherein the ring body includes two projections, as the retaining clip, spaced apart from each other at the one end portion, and the latch tab includes two clipping slots holding the two projections of the ring body when the connecting lever is attached to the lever body.

5. A hose clamp according to claim 1, wherein the ring body further includes a locating notch arranged to engage a locater tab of a hose.

6. A hose clamp according to claim 1, wherein the ring body further includes inner and outer flex grooves to reduce torsional stresses during clamping.

* * * * *